March 27, 1962  D. C. FRICK ETAL  3,027,176
LEVELING APPARATUS FOR FLUID SUSPENSION SYSTEMS
Filed Dec. 22, 1958  5 Sheets-Sheet 1
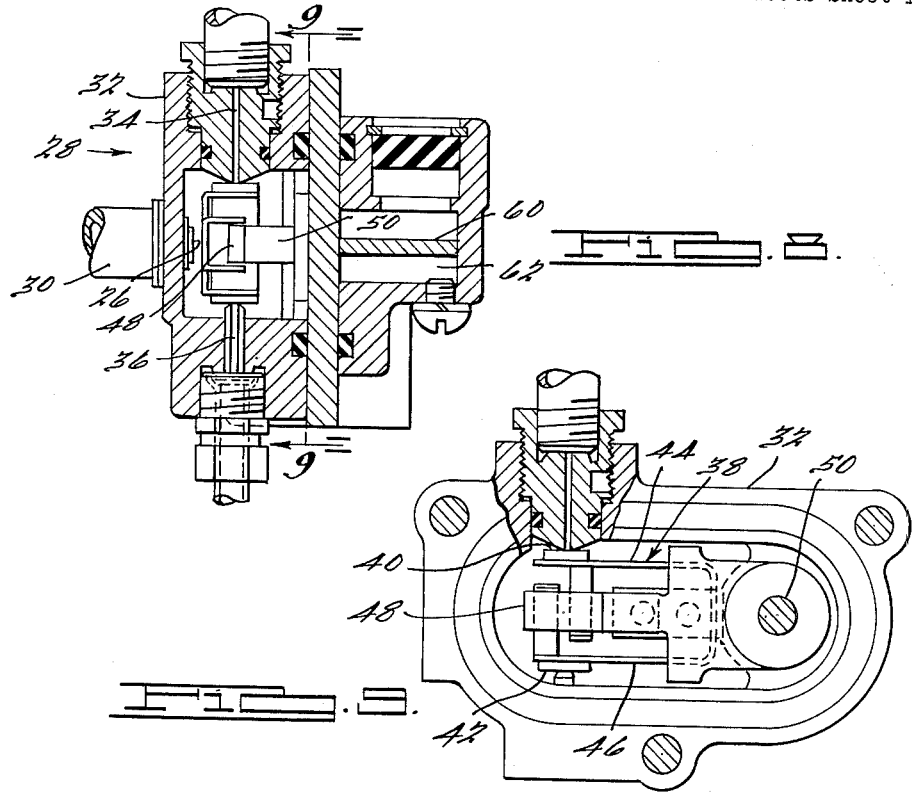
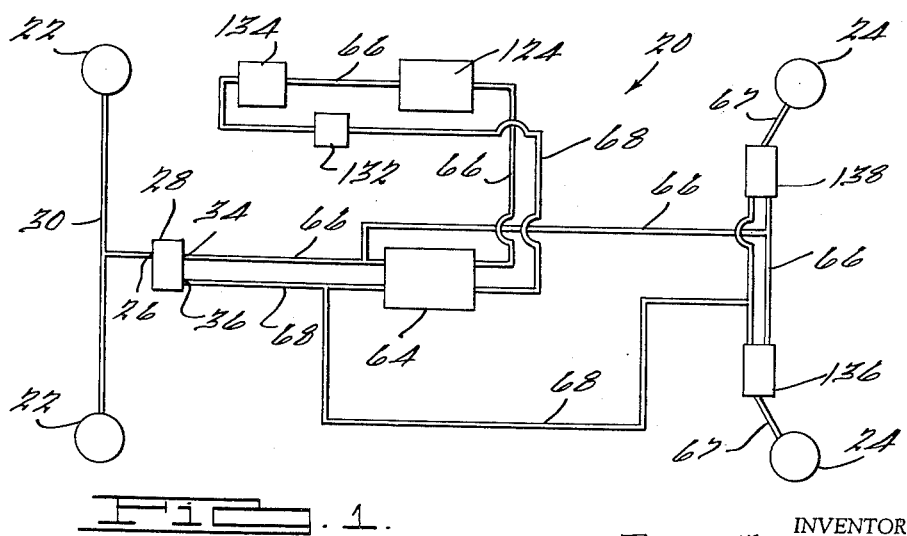
FIG. 1.
INVENTORS.
Darrell C. Frick,
Jack L. Wise.
BY
Harness and Harris
ATTORNEYS.

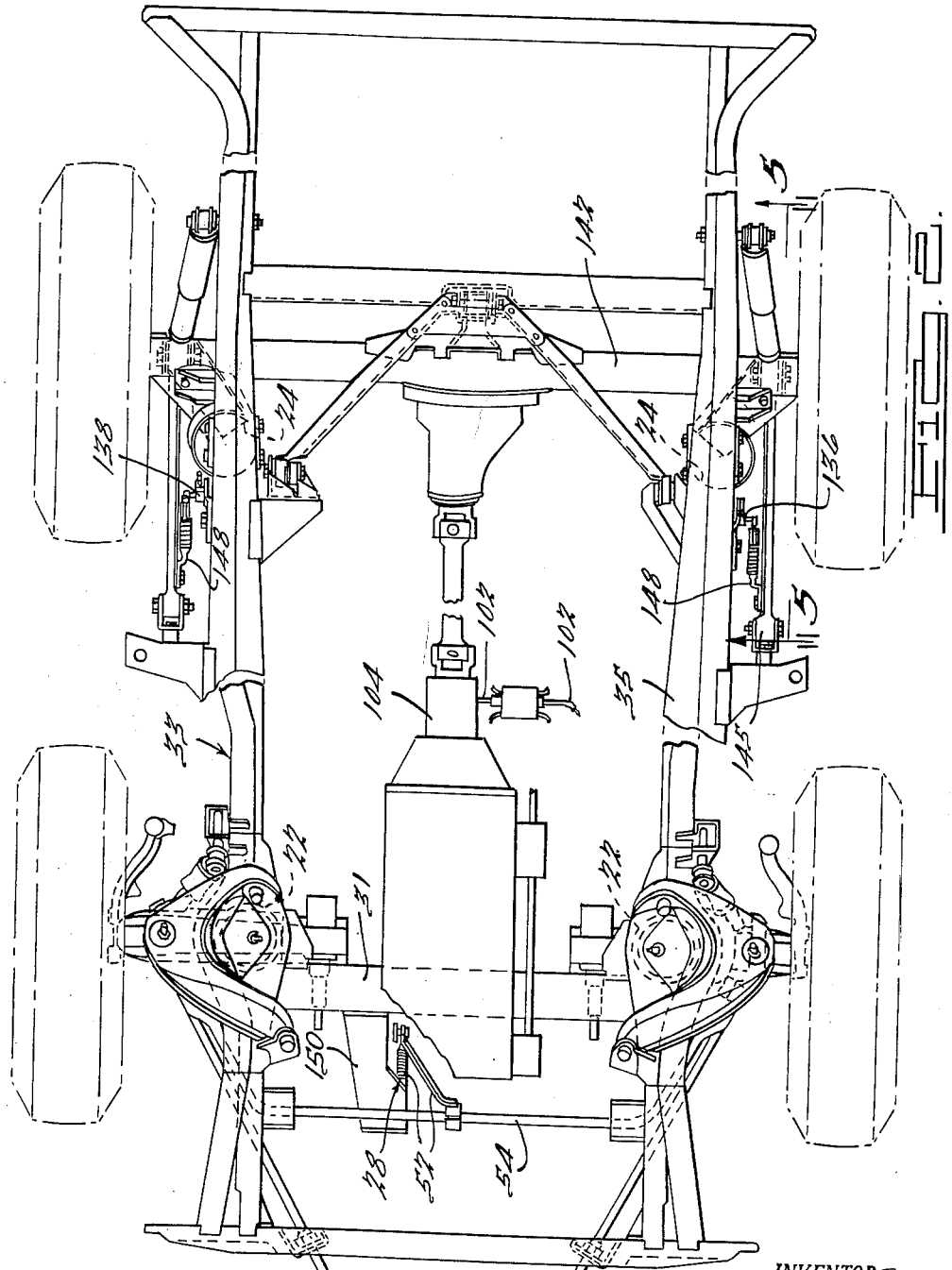

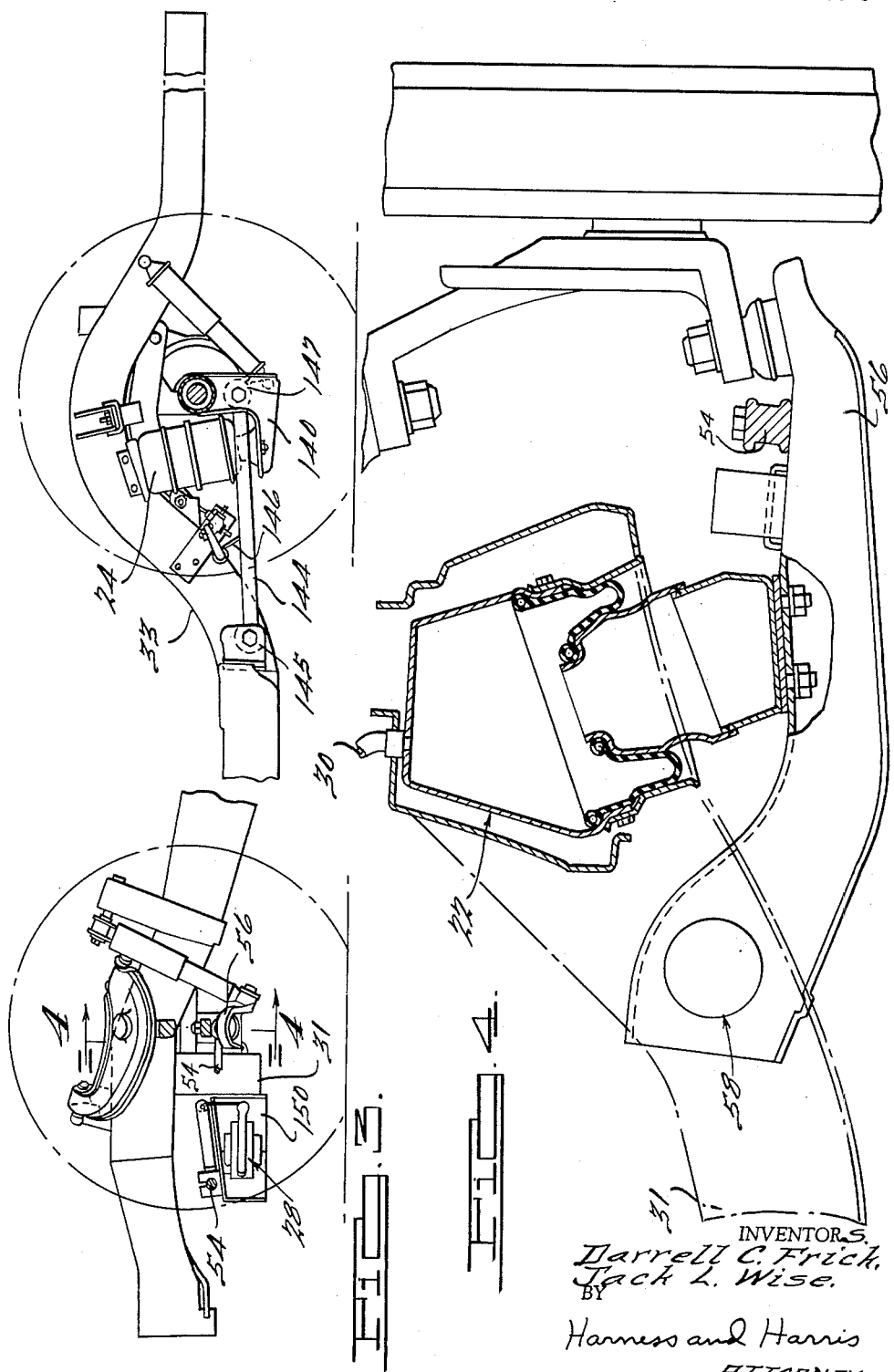

March 27, 1962
D. C. FRICK ETAL
3,027,176
LEVELING APPARATUS FOR FLUID SUSPENSION SYSTEMS
Filed Dec. 22, 1958
5 Sheets-Sheet 4
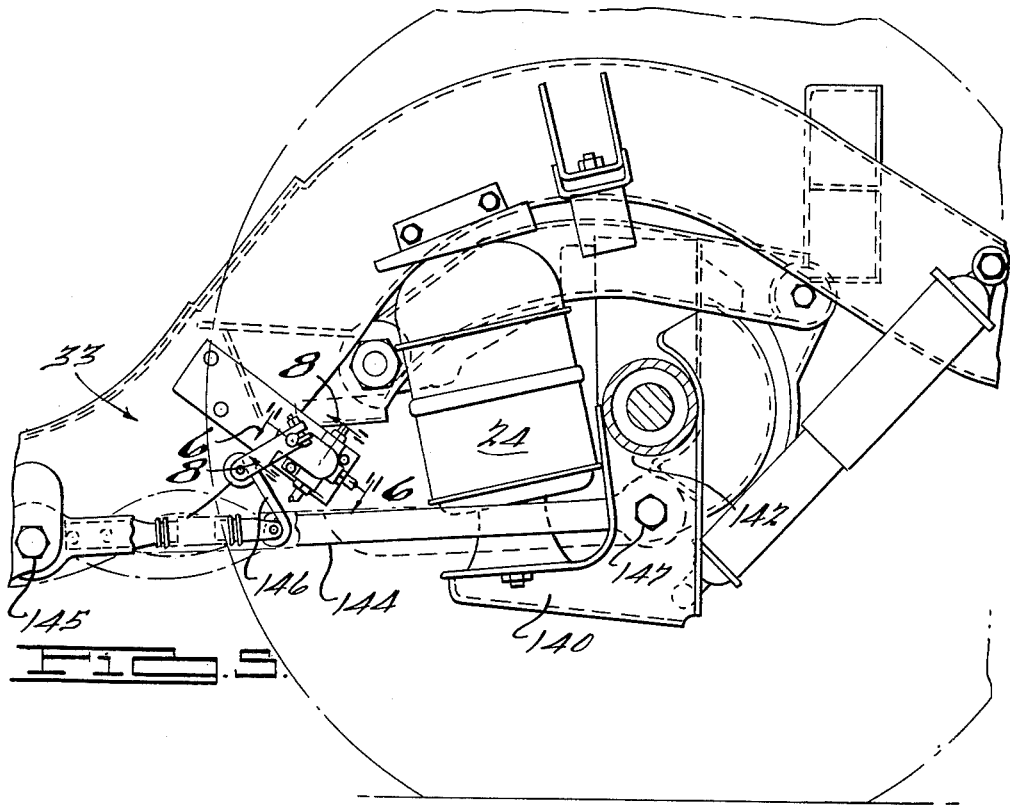
FIG. 5.
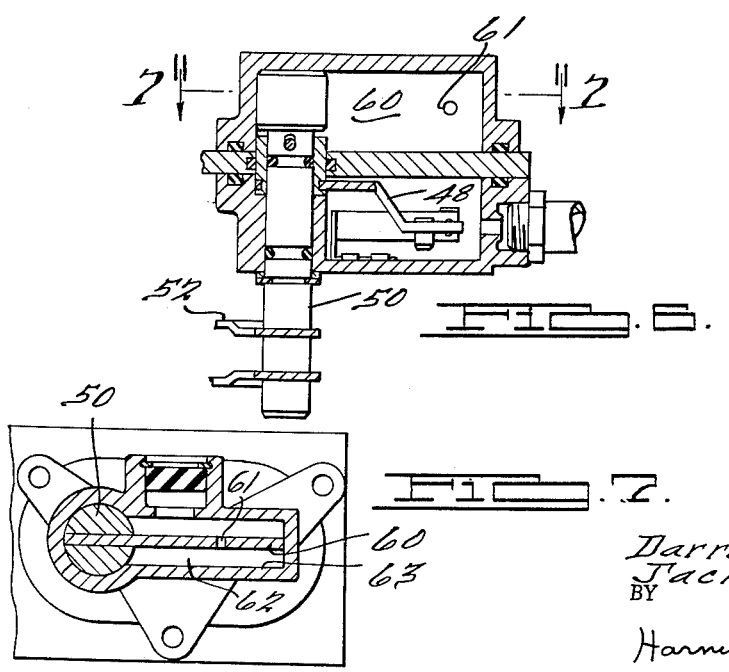
FIG. 6.
FIG. 7.
INVENTOR.
Darrell C. Frick,
Jack L. Wise.
BY
Harness and Harris
ATTORNEYS.

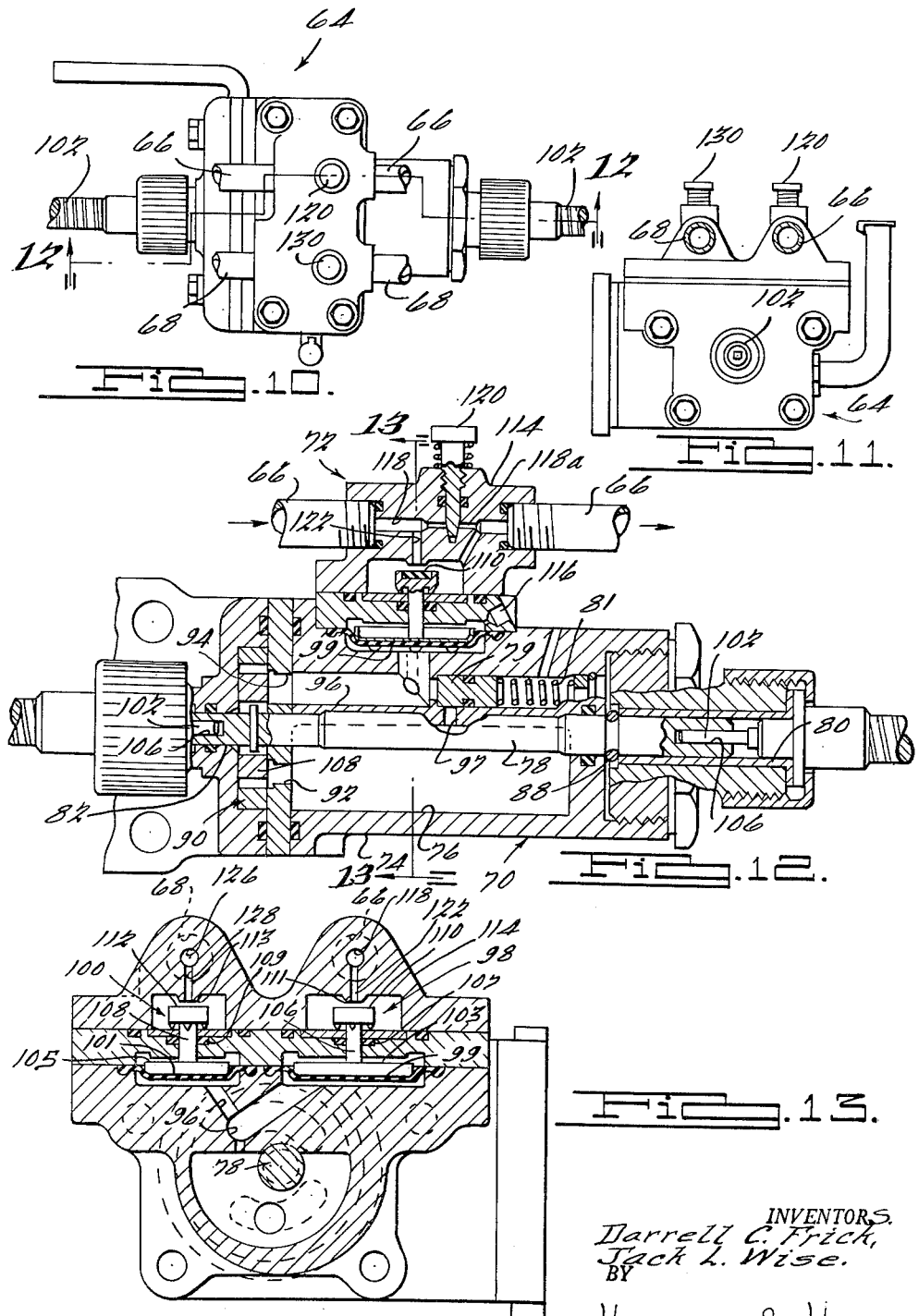

United States Patent Office 3,027,176
Patented Mar. 27, 1962

3,027,176
LEVELING APPARATUS FOR FLUID SUSPENSION SYSTEMS
Darrell C. Frick, Detroit, and Jack L. Wise, Trenton, Mich., assignors to Chrysler Corporation, Highland Park, Mich., a corporation of Delaware
Filed Dec. 22, 1958, Ser. No. 782,093
4 Claims. (Cl. 280—124)

This invention relates to fluid suspension systems of the type used on automotive vehicles and particularly relates to the novel structure of and arrangement within said systems of fluid flow rate control means which prevents rapid fluctuations in fluid pressure within the fluid springs of said suspension systems while the vehicles are in motion, but, allows rapid fluctuations of said pressure when the vehicle is stopped, or nearly so, to allow leveling of the vehicle to occur in response to variations in loading or unloading thereof due to passengers or other weight.

In vehicle fluid suspension systems employing leveling valves for adjusting the pressure within the air springs thereof, a serious problem is created by vehicle body sway due to the fact that leveling or raising of one side of the vehicle body by the leveling mechanism may occur during the first half of an S-shaped curve to offset the normal sway of the body and when the vehicle proceeds into the second half of said S-shaped curve the body sways in the opposite direction to the first sway and the second sway is greatly accentuated by the aforesaid leveling. This action adversely effects vehicle handling and could possibly result in tipping over of the vehicle or at least cause discomfort to the occupants.

It is also desired to normally accomplish the leveling of the vehicle when the vehicle is at rest so that the leveling action is divorced from the variations in car height resulting from jounce and rebound due to road irregularities.

The present invention presents an economical and feasible answer to the aforesaid problem in providing fluid suspension systems with a flow rate control means which comprises a first vehicle speed responsive flow rate control valve located in the fluid feed line to the air springs, a second vehicle speed responsive flow rate control valve located in the fluid discharge line of said air springs, and a pressure developing pump connected to a drive portion of the vehicle and responsive to changes in the speed of the vehicle. The pump may have the drive portion thereof connected to the drive cable of the speedometer or any other vehicle speed responsive device. The pump is inactive when the vehicle is not in motion and the flow rate control valves are therefore incapable of restricting fluid flow through the lines. In this condition, rapid ingress and egress of air into and out of the air springs may occur and cause rapid leveling of the vehicle in response to variations in loading thereof either by passengers or other weight. As the vehicle begins to pick up speed however the pump will develop pressure and cause the flow rate control valves to restrict the fluid flow to and from the springs to such an extent that only sustained body sway over several seconds will cause the leveling mechanism to be effective in changing the body support.

It is a major object of this invention therefore to regulate the rate of flow of fluid through a fluid suspension system of a vehicle according to the speed of travel of said vehicle.

Another object is to provide a means to prevent rapid fluctuation in the pressure within the air springs of a vehicle air suspension system while the vehicle is in motion.

A further object is to provide a vehicle fluid suspension system with a vehicle speed responsive fluid flow rate control means for proportionately adjusting the rate of flow of fluid through said system, or portions thereof, according to vehicle speed.

A specific object is to provide an automotive air suspension system having air springs, an air pressure source, and leveling valves controlling the volume of air flow to and from the springs, with an air flow rate control means which is operatively connected to a vehicle speed indicating portion of said vehicle, such as the transmission output shaft or the speedometer cable, and which is further operatively connected to the inlet and discharge conduits of said leveling valves to regulate the rate of air flow through these conduits according to the speed of said vehicle.

Other objects and advantages will become apparent from the following description and drawings, in which:

FIGURE 1 represents a diagrammatic view of a fluid suspension system embodying the present invention;

FIGURE 2 represents a top view of an automotive chassis and wheel assembly having the present invention mounted thereon;

FIGURE 3 represents a side view of the assembly of FIGURE 2;

FIGURE 4 represents an enlarged cross sectional view of the air spring assembly of the front wheel of FIGURE 3, the view being taken along the line 4—4 thereof;

FIGURE 5 represents an enlarged elevational view of the air spring and leveling valve assembly of FIGURE 2 taken along the line 5—5 thereof;

FIGURE 6 represents a cross sectional view of the leveling valve of FIGURE 5 taken along the line 6—6 thereof;

FIGURE 7 represents a cross sectional view of the valve of FIGURE 6 taken along the line 7—7 thereof;

FIGURE 8 represents a cross sectional view of the leveling valve of FIGURE 5 taken along the line 8—8 thereof;

FIGURE 9 represents a cross sectional view of the valve of FIGURE 8 taken along the line 9—9 thereof;

FIGURE 10 represents a top plan view of the flow rate control means;

FIGURE 11 represents a side view of the control means of FIGURE 10;

FIGURE 12 represents a cross sectional view of the control means of FIGURE 10 taken along the line 12—12 thereof; and FIGURE 13 represents a cross sectional view of the valve of FIGURE 12 taken along the line 13—13 thereof.

Referring to FIGURE 1 of the drawings, an air suspension system 20 is diagrammatically shown and comprises front air suspension springs 22 and rear air suspension springs 24, all of which may be identical in construction and operation and are adapted for mounting on a chassis frame 33 as shown in FIGURES 2 through 5. One or more of these springs may be mounted adjacent each wheel but in the drawings and description reference is made to only one spring for each wheel of a four-wheeled vehicle. Front springs 22 are connected to the working port 26 of a front leveling valve 28 by a fluid conduit 30 (see FIGURE 8). This leveling valve 28 is of the type described in copending application of Otto J. Winkelmann, Serial No. 682,737, filed September 9, 1957, now U.S. Patent No. 2,945,702, and comprises (see FIGURES 5 through 9) a housing 32 adapted for connection to the front engine support 31 of chassis frame 33 and having an air inlet port 34, an air discharge or exhaust port 36, and the aforesaid working port 26. Porting means 38 comprising porting faces 40, 42 attached to spring arms 44, 46 respectively is located in housing 32 and is actuated by an actuating arm 48 mounted on shaft 50 which is in turn connected to resilient linkage generally designated 52 extending outwardly from housing 32 and connected to the front sway bar 54. This sway bar 54 is connected at each end to the lower control arms 56 (see FIGURE 4) which are pivotally mounted at 58 to cross member 31 on each side of the chassis. Pivotal movement of control arms 56 (see FIGURE 2) will cause bar 54 to twist and urge linkage 52 to move and cause rotation of shaft 50 which will bring actuating arm 48 into contact with one or the other of the spring arms 44 or 46 and cause the port 34 or 36 associated therewith to be opened. Dashpot vane 60 (see FIGURE 6) operatively connected to shaft 50 and having bleed hole 61 therein and viscous fluid 62 substantially filling cavity 63 in housing 32 prevents rapid rotation of shaft 50 in response to movement of resilient linkage 52.

Referring further to FIGURE 1, inlet port 34 and discharge port 36 of leveling valve 28 are connected to flow rate control means 64 by a fluid feed conduit 66, and by a return fluid conduit 68 respectively. Control means 64 (see FIGURES 10 through 13) comprises a pressure developing means 70 and a pressure responsive valve means 72 operatively interconnected. Pressure developing means 70 comprises a body or housing 74 having a fluid sump 76 therein, and a rotor shaft 78 mounted in bearings 80 and 82 on opposite ends of housing 74. Snap ring 88 on shaft 78 longitudinally fixes shaft 78 in housing 74. An eccentric internal gear pump 90 of the type shown in Patent 2,022,781 is operatively connected to shaft 78 and receives fluid from sump 76 through pump inlet 92 and discharges it under pressure through pump outlet 94 into duct 96 connecting with the feed conduit flow rate control valve 98 and the discharge conduit flow rate control valve 100. Drive cable 102 for rotor shaft 78, which may be conveniently the speedometer cable, is geared to the output shaft of the vehicle transmission 104 in the conventional manner and is connected in sockets 106 in each end of shaft 78 by suitable keying means and is adapted to rotate shaft 78 and pump rotor 108 at speeds directly proportional to the speed of the vehicle. Relief valve 79 in body 74 is urged to its closed position by spring 81 and is adapted to prevent excessive pressure buildup in pump discharge duct 96 due to high vehicle speeds by allowing fluid to bleed from supply duct 96 through bleed 97 into sump 76 when said pressure causes the valve 79 to move to the right against spring 81.

The pressure responsive valves 98 and 100 consist of flexible diaphragms 99 and 101 respectively secured to rigid backup members 103 and 105 respectively. Members 103 and 105 support valve stems 106 and 108 and feed porting face 110 and discharge porting face 112 respectively. Stems 106 and 108 are slidably mounted in the fluid seals 107 and 109 respectively in body 114 of valve means 72. An air bleed 116 (see FIGURE 12) is provided for the top side of each of the diaphragms 99, 101.

The fluid feed line 66 is suitably threaded and sealed into body 114 which has a straight fluid feed passage 118 therethrough that includes a reduced portion 118a which may be adjusted by a needle valve 120. A second fluid feed passage 122 bypasses needle valve 120 but is adapted to have flow therethrough controlled by the valve porting face 110 and the feed port 111 of feed flow rate control valve 98 as the speed of the vehicle increases and causes pump 90 to increase the fluid pressure on diaphragm 99 thereby urging face 110 towards port 111. The flow of fluid from the pressure accumulator 124 (see FIGURE 1) through conduit 66 and flow rate control means 64 to the front leveling valve 28 can thus be controlled according to vehicle speed.

The discharge fluid passages 126 and 128 of discharge flow rate control valve 100 are connected to the discharge conduit 68 and are arranged in the identical manner to that of passages 118 and 122 of feed valve 98, and porting face 112 and discharge port 113 of discharge valve 100 are adapted to control the discharge flow through passage 128 in response to fluid pressure on diaphragm 101 in the identical manner to that of port 111, porting face 110, and diaphragm 99 of feed valve 98. Needle valve 130 adjusts the size of passage 126 in discharge valve 100. Diaphragm 101 is smaller in effective area than diaphragm 99 to establish substantially the same pressure differential across each said diaphragm and thereby maintain a uniformly gradual pressure drop throughout the system.

Discharge line 68 may be provided with a minimum pressure valve 132 (see FIGURE 1) to maintain sufficient pressure in the system to overcome the inherent pressure drop therethrough. Line 68 dumps into the intake of compressor 134 to provide a closed air system which eliminates continuous charging the system with fresh air that might contain line clogging dust and/or moisture which in cold weather produces ice and fouls the system.

Referring further to FIGURE 1, rear leveling valves 136 and 138, for separately regulating the volume of air flow to each of the rear springs 24, are connected to branches of the fluid feed conduit 66 and the fluid discharge conduit 68 through ducts 67 and are of identical construction to and operate in the identical manner to the front leveling valve 28. The position of these rear valves adjacent to the springs 24 allows the individual adjustment of the rear springs for off-center or uneven side loading of the vehicle.

The location and mountings for the elements of this suspension system is shown in FIGURES 2 through 5. The rear air springs 24 (see FIGURE 5) are mounted between the chassis frame 33 and a support bracket 140 mounted on rear axle carrier 142. Each of the rear leveling valves is secured to the chassis 33, and the actuating arm of each is connected to a rear stabilizing arm 144 through a link arm 146 and a spring arm 148. These stabilizing arms are pivotally mounted at 145 and 147 to the chassis 33 and the axle carrier 142 at each side of the vehicle and indicate relative motion between the chassis frame and the rear axle carrier. Front springs 22 (see FIGURE 4) are mounted between the front engine support cross member 31 forming part of chassis 33 and the associated lower control arm 56 on either side of the vehicle. The front leveling valve 28 is attached to a bracket 150 (see FIGURE 3) secured to member 31 and is linked to sway bar 54 through the resilient linkage 52.

We claim:

1. In an automotive vehicle having a chassis frame, a vehicle drive mechanism, and front and rear wheels mounted respectively on a front and rear axle, a fluid suspension system comprising fluid actuated springs supporting said chassis frame on said axles, leveling valve means operatively connected to said springs, a source of fluid pressure, feed conduit means connecting said source to said leveling means, discharge conduit means on said leveling means, said leveling valve means being adapted to regulate the volume of fluid flowing to and from said springs, and speed responsive fluid flow control means operatively connected to said drive mechanism and to each said conduit means control the high speed flow of fluid through each said conduit means according to the speed of said vehicle, said control means comprising a first adjustable pressure responsive valve in said feed conduit means, a second adjustable pressure responsive valve in said discharge conduit means, vehicle speed adjustable pressure developing means operatively connected to each said valve and operable to adjust each of said valves to regulate the rate of flow through each of said conduits in proportion to the speed of said vehicle, and by-pass fluid feed and exhaust conduit means operative to allow moderated flow of fluid to said springs when said valves have completely shut off the high speed flow.

2. In an automotive vehicle having a chassis, a vehicle speed indicating mechanism, and front and rear wheels mounted respectively on a front and rear axle, a fluid suspension system comprising fluid actuated springs supporting said chassis on said axles, leveling means operatively connected to said springs, a source of fluid pressure, feed conduit means connecting said source to said leveling means, discharge conduit means on said leveling means, and speed responsive fluid flow control means operatively connected to said speed indicating mechanism and to each said conduit means to control the rate of flow of fluid through each said conduit means according to the speed of said vehicle, said fluid flow control means comprising a first adjustable pressure responsive valve in said feed conduit means, a second adjustable pressure responsive valve in said discharge conduit means, and speed adjustable pressure developing means operatively connected to each said valve and said speed indicating mechanism and operable to adjust each of said valves to regulate the flow through each of said conduits according to the speed of said vehicle, said second valve being less responsive than said first valve to pressure developed by said pressure developing means to compensate for the inherent pressure drop through the suspension system.

3. In an automotive vehicle having a chassis, a vehicle speed indicating mechanism, and front and rear wheels mounted respectively on a front and rear axle, a fluid suspension system comprising fluid actuated springs supporting said chassis on said axles, a source of fluid pressure, feed conduit means connecting said source to said springs, discharge conduit means on said springs, and speed responsive fluid flow control means operatively connected to said speed indicating mechanism and to each said conduit means to control the rate of flow of fluid through each said conduit means according to the speed of said vehicle, said fluid flow control means comprising a first adjustable pressure responsive valve in said feed conduit means, said first valve comprising a feed port and a feed porting face, said face being carried by a first plunger operatively connected to a first pressure responsive diaphragm, said face and plunger being adapted for movement toward and away from said feed port in response to increases and decreases in pressure respectively on said first diaphragm, a second adjustable pressure responsive valve in said discharge conduit means, said second valve comprising a discharge port and discharge porting face, said discharge face being carried by a second plunger operatively connected to a second pressure responsive diagraphrm, said second discharge face and second plunger being adapted for movement toward and away from said discharge port in response to increases and decreases in pressure respectively on said second diaphragm, a fluid pump having an inlet communicating with a fluid sump and having an outlet communicating with each of said diaphrams, said pump being operatively connected to said vehicle speed indicating mechanism to develop fluid pressure at its outlet corresponding to the speed of said vehicle.

4. In an automotive vehicle having a chassis, a vehicle speed indicating mechanism, and front and rear wheels mounted respectively on a front and rear axle, a fluid suspension system comprising fluid actuated springs supporting said chassis on said axles, a source of fluid pressure, feed conduit means connecting said source to said springs, discharge conduit means on said springs, and speed responsive fluid flow control means operatively connected to said speed indicating mechanism and to each said conduit means to control the rate of flow of fluid through each said conduit means according to the speed of said vehicle, said fluid flow control means comprising a first adjustable pressure responsive valve in said feed conduit means, said first valve comprising a feed port and a feed porting face, said face being carried by a first plunger operatively connected to a first pressure responsive diaphragm, said face and plunger being adapted for movement toward and away from said feed port in response to increases and decreases in pressure respectively on said first diaphragm, a second adjustable pressure responsive valve in said discharge conduit means, said second valve comprising a discharge port and discharge porting face, said discharge face being carried by a second plunger operatively connected to a second pressure responsive diaphragm, said second discharge face and second plunger being adapted for movement toward and away from said discharge port in response to increases and decreases in pressure respectively on said second diaphragm, a fluid pump having an inlet communicating with a fluid sump and having an outlet communicating with each of said diaphragms, said pump being operatively connected to said vehicle speed indicating mechanism to develop fluid pressure at its outlet corresponding to the speed of said vehicle, and needle valve means in each of said conduit means for further adjusting the rate of fluid flow therethrough.

References Cited in the file of this patent
UNITED STATES PATENTS

| 2,687,311 | Nallinger | Aug. 24, 1954 |
| 2,734,589 | Groen | Feb. 14, 1956 |
| 2,787,475 | Jackson | Apr. 2, 1957 |
| 2,819,092 | Proctor | Jan. 7, 1958 |
| 2,925,284 | Szostak | Feb. 16, 1960 |
| 2,962,296 | Jackson | Nov. 29, 1960 |